United States Patent [19]

Di Giacomo et al.

[11] Patent Number: 4,913,690

[45] Date of Patent: Apr. 3, 1990

[54] DRIVING BELT

[75] Inventors: Tommaso Di Giacomo, Chieti; Domenico Arces, Bari, both of Italy

[73] Assignee: Pirelli Trasmissioni Industriali S.p.A., Italy

[21] Appl. No.: 367,138

[22] Filed: Jun. 16, 1989

[30] Foreign Application Priority Data

Jun. 16, 1988 [IT] Italy .................................. 20987 A/88

[51] Int. Cl.$^4$ .................................................. F16G 1/08
[52] U.S. Cl. ...................................... 474/250; 474/268
[58] Field of Search ............... 474/204, 205, 237, 238, 474/240, 242, 249, 250, 251, 252, 265, 263, 268, 261, 266; 156/137–142

[56] References Cited

U.S. PATENT DOCUMENTS

| | | | |
|---|---|---|---|
| 4,002,082 | 1/1977 | Waugh | 474/250 |
| 4,647,278 | 3/1987 | Hull | 474/250 X |
| 4,832,670 | 5/1989 | Miranti, Jr. | 474/250 X |

*Primary Examiner*—Thuy M. Bui
*Attorney, Agent, or Firm*—Stevens, Davis, Miller & Mosher

[57] ABSTRACT

A belt formed of elastomeric material is provided for transmission of forces in cooperation with at least two pulleys. The belt is formed by an outer part under traction, an inner part under compression and an intermediate part interposed between the inner and outer parts. The inner part includes at least two lateral, opposite and convergent surfaces suitable for transmitting frictional forces with the corresponding surfaces of the pulleys. The belt includes a plurality of transversely directed alternating protuerances and cavities in the inner part. The sequence of transversal cavities and protuberances define an undulated profile. The ratio between the pitch (p) and the depth (h) of the transversal cavities is between 8 and 20, and the ratio between the radius of curvature (r) of the transversal cavities and the depth (h) of the cavities is between 3 and 6.

14 Claims, 2 Drawing Sheets

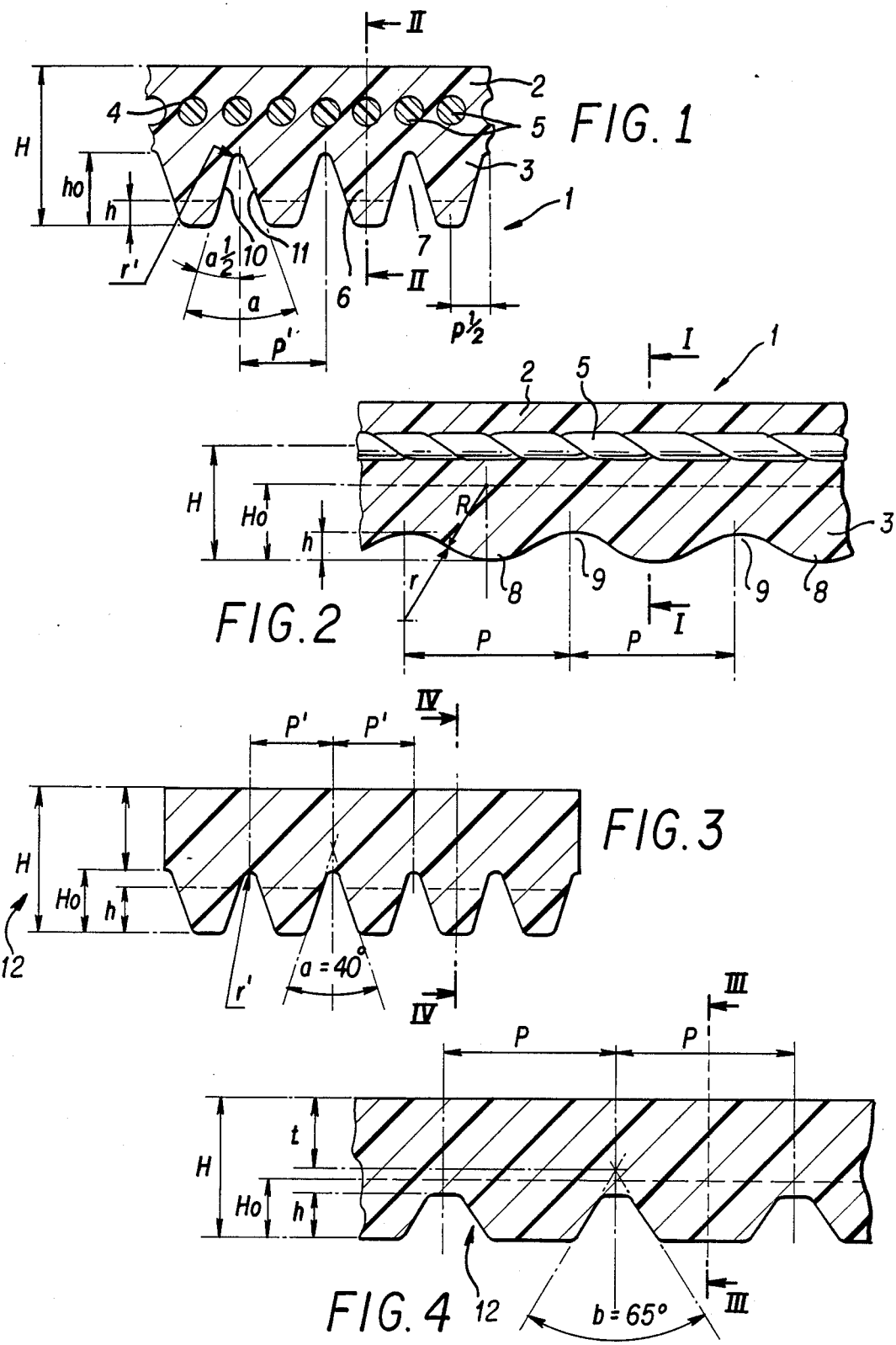

DRIVING BELT

Field of the Invention

The present invention relates to a driving belt and, more particularly, to a driving belt formed of elastomeric material or the like comprising an inner or lower portion with at least two lateral, opposite and convergent surfaces, intended to transmit frictional forces in cooperation with corresponding surfaces of at least two pulleys.

Background of the Invention

As known, a belt of the above-noted type generally comprises an outer part under traction, i.e., adapted to be subjected to tensile stresses during the winding step of the belt on the pulley, a lower part adapted to be subjected to compressive stresses and consequently denominated an inner compressive part, and an intermediate part interposed between the two previous parts and adapted to bear the load to be transmitted between the belt and the pulley.

The central part of the belt usually is formed by elongate inextensible elements, in particular, traction resistant cords, placed side-by-side and extending longitudinally.

The inner part of the belt comprises, as indicated above, at least two lateral, opposite and convergent surfaces.

The belt can be constituted at the inner compressive part by only two convergent surfaces having a configuration defined by a trapezium in a portion transversal to the belt maximum extension, thus assuming the definition of a V-belt.

The transmission of motion takes place among the convergent sides of the V-belt and the two corresponding surfaces of the two pulleys: the driven pulley and the driving pulley, respectively.

According to another configuration, the belt can be constituted by a plurality of V-belts, i.e., by a plurality of lower portions, each one provided with two opposite and convergent surfaces, arranging for joining together the various belts at the upper part by means of a connecting tape or the like.

A type of belt is also known and used, which is flat at the tensile part and grooved on the compressive inner surface and has small transversal thicknesses, usually between 3 and 16 mm.

This type of belt, known as a grooved belt, comprises on the inner surface of the compressive part a plurality of longitudinal ribs, particularly in the form of a "V", alternating with grooves or longitudinal cavities; the grooved belt by the compressive inner surface transmits frictional forces necessary for the motion when it is in contact with the outer surface of the two pulleys which are provided in turn with ribs and circumferential grooves corresponding to the ones on the belt.

The previously cited driving belts, during winding for a certain arc around pulleys having a small radius of curvature, are subjected to strong compressive stresses in the lower part with contractions tending to cause wavings which spread into the mass of elastomeric material at any point at which they find a way out.

In particular, the cited wavings can spread up to the surface formed between the cords bearing the load and the elastomeric material, causing thus a relative detachment between the cords and the elastomeric material and in a short while destruction of the belt.

Particularly, the compressive condition and the contractions deriving therefrom are much stronger in the grooved belts where, due to the tapered portion of the longitudinal ribs, the collapsing of the ribs can take place with a consequent lateral distortion of the same and an irregularity from the belt longitudinal ribs being inserted between the grooves of the pulleys.

Further configurations suitably provided for overcoming the cited drawback are already known.

In fact, driving belts provided with cavities arranged transversely in the lower compressive part are known.

As an example, U.S. Pat. Nos. 2,728,239 and 2,602,511 disclose substantially flat belts of elastomeric material comprising on the inner surface of the compressive part both a plurality of longitudinal ribs alternating with longitudinal cavities and plurality of cavities extending transversely of the belt in order to greatly increase the belt flexibility in order to easily fit the same to pulleys having accentuated curvatures.

Unfortunately, even if on the one hand these configurations reduce favorably the compressive deformations and the drawbacks connected thereto, they, on the other hand, produce a further drawback which can be found in an accentuated noise in composition with belts devoid of transversal cavities.

The noise of the known belts is affected by various elements, as for instance, the number of revolutions per minute of the pulleys, the materials of which both the belts and the pulleys are formed, the mechanical parts associated with the pulleys, the portion of the belt between the pulleys, and the tension of the belt.

Despite the complexity of the involved phenomena, it can be stated that the noise effects can be caused, at least in a non-negligible measure, by the air which enters between the transversal cavities before the belt is wound on the pulleys and which remains entrapped in these cavities and the enclosing or guiding surfaces of the pulleys, resulting in a kind of whizzing noise resulting from the sudden escape of the air from the spaces where it was enclosed, when the belt is no longer acting on the pulleys.

The sequence of transversal cavities arranged according to a determined pitch, turns into a continuous repetition of the phenomenon so as to reach levels of noise unacceptable for the user of the driving device.

Summary of the Invention

Therefore, the object of the present invention is to provide a driving belt which is able to overcome all of the above-mentioned disadvantages and which at the same time can be wound, without disturbing its structural integrity, on pulleys having accentuated curvatures while furthermore avoiding generation of unacceptable noises.

The present invention provides a belt of elastomeric material suitable for transmitting forces in cooperation with at least two pulleys, said belt comprising an outer part under traction, an inner part under compression, an intermediate part interposed between the outer part and the inner part and adapted to transport the load. The compressive part comprises in a longitudinal direction at least two lateral, opposite and convergent surfaces, intended to transmit frictional forces with the corresponding surfaces of a pulley and a plurality of cavities directed transversely to said lateral surfaces, said transversal cavities alternating with a plurality of protuberances. The belt is characterized in that the alternating transversal protuberances and cavities are delimited by an undulated profile formed by curvilinear sections substantially in the form of circular arcs. The curvilinear section of each protuberance has a curvature opposite to the curvilinear sections of the adjacent transversal cavities. The ratio between the pitch and the maximum depth of the transversal cavities is between 8 and 20, and the ratio between the radius of curvature of the transversal cavities and the maximum depth of the transversal cavities is between 3 and 6.

Brief Description of the Drawings

The present invention will be better described with reference to the following detailed description and the attached sheets of drawings, of which:

FIG. 1 is a cross-section of an embodiment of a belt according to the invention;

FIG. 2 is a cross-section of the belt shown in FIG. 1 along line II—II;

FIG. 3 is a cross-section of a belt compared with the belt of the invention of FIGS. 1 and 2;

FIG. 4 represents a section of the belt of FIG. 3 along line IV—IV,

DETAILED DESCRIPTION OF THE PREFERRED EMBODIMENTS

Figure 5:
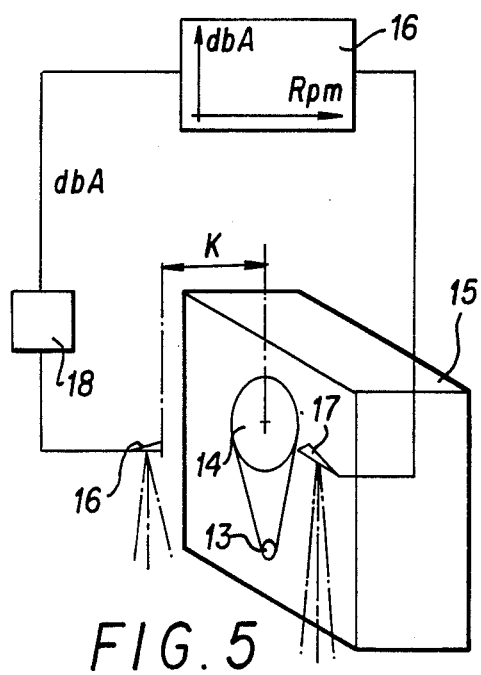
FIG. 5 shows a system for conducting a noise comparison test for the belts of FIGS. 1, 2, 3 and 4, respectively.

In FIG. 1 reference numeral 1 represents a belt of the grooved type formed by a substantially flat body of elastomeric material divided into an upper or outer part 2 apt to be subject to compression, an intermediate part 4 interposed between the previous ones 2 and 3 intended to bear the load of the driving device due to the presence of a plurality of elongate elements 5 placed side by side and having characteristics of high tensile strength.

Elongate elements 5 are arranged on a plane which defines the "neutral axis" or the "pitch surface" of the belt, and according to some possible embodiments, elements 5 can be constituted by cords of nylon, aramidic fiber, polyester fiber, glass fiber or materials substantially equivalent with respect to their inextensibility characteristics.

Lower part 3, as shown in FIG. 1, comprises a plurality of longitudinal ribs 6 alternate with longitudinal cavities 7 and, as shown in FIG. 2, comprises a plurality of transversal protuberances 8 alternate with transversal cavities 9 which have depths that, in the illustrated embodiment, are shallower than that of longitudinal cavities 7. In addition, the belt is stressed along the dashed lines of FIG. 1.

The belt of FIG. 1 shows longitudinal ribs 6 in the form of a trapezium and longitudinal cavities 7 in the form of a "V", but it should be understood that for the purposes of the invention, longitudinal ribs 6 could have the form of a "V" too.

The surface of lower part 3 of the belt is intended to transmit forces of friction in cooperation with corresponding surfaces of at least two pulleys (not shown) which are provided with ribs extending circumferentially according to known solutions. Therefore, the lateral, opposite and convergent surfaces 10 and 11 of each rib 6 are intended to transmit motion by frictional engagement with the pulleys.

Belt 1 is characterized by the fact that the sequence (FIG. 2) of transversal protuberances 8 alternating with transversal cavities 9 defines an undulated profile, without solutions of continuity, formed by curvilinear sections defined by circular arcs or arcs which approximate circular arcs.

Therefore, the present belt comprises longitudinal ribs 6 which have on the their head surfaces an undulated surface instead of a flat one.

The circular arc-shaped profile of each protuberance 8 is defined by a radius R and has a curvature opposite to the circular arc-shaped profile of the transversal cavity 9 defined by a radius r.

An important characteristic of the present invention lies in the fact that the ratio between the pitch "p" of the sequence of protuberances 8 of cavities 9 and the maximum depth "h" of cavities 9 is between 8 and 20, extremes included, and moreover, by the fact that the ratio between the radius of curvature "r" of transversal cavities 9 and the depth "h" of cavities 9 themselves is between 3 and 6, extremes included.

Further, from the previously mentioned characteristics, it results that the relationship between the radius R and the radius r of the circular arc-shaped sections depends on the previously cited parameters and is determined by the following expression:

$$(R+r)^2 = (P/2)^2 + (R+r-h)^2$$

to which the final expression corresponds:

$$(R+r) = \frac{p^2 + 4 \times h^2}{8h}$$

Preferably, the ratio p/h is at most equal to 14 and, still more preferably, is between 8 and 10.

The ratio r/h is preferably between 3.8 and 4.5 and, still more preferably, between 3.5 and 4.2.

Moreover, $H_c$ represents the distance between the axis of cords 5 and the head of the longitudinal ribs. Preferably, a ratio $h/H_c$ is between 0.15 and 0.6 and, more preferably, between 0.2 and 0.4.

According to a preferred embodiment of the present invention the belt of FIGS. 1 and 2 is defined by the following values:

total height of the belt, H=3.6 mm;
height of the longitudinal ribs 6, Ho=1.6 mm;
pitch between longitudinal ribs 6, p'=2.34 mm;
angle between surfaces 10 and 11 of the longitudinal ribs placed side by side, a=40° (degrees);
radius between surfaces 10 and 11 of longitudinal ribs 6 placed side by side, r'=0.1 mm;
depth of transversal cavities 9, h=0.53;
pitch of transversal cavities 9, P =4.4;
radius of curvature of the circular arc of transversal cavities 9, r=2.1;
radius of curvature of the circular arc of protuberance 8, R=2.31.

The now described belt, due to the presence of transversal cavities 9 and, in particular, to the opening outwards of cavities 9 as shown in FIG. 2, provides advantages and facilitated winding of the belt on pulleys having accentuated curvatures avoiding collapsing phenomena of longitudinal ribs 6 because of a buckling load.

The flexibility increase of the present belt is obtained by means of a contemporaneous and appreciable reduction of the noise as it can be noted from the test carried out by comparing a belt provided with an undulated profile and ratios P/h and r/h as previously indicated and a belt devoid of the characteristics of an undulated lateral profile.

Belt 12, (shown in FIGS. 3 and 4) compared with the belt according to the present invention is identified by the following dimensional data with the parameters shown in FIGS. 3 and 4:

total height of the belt, H=3.6 mm;
height of the longitudinal ribs, Ho=1.6 mm;
pitch between the longitudinal ribs, p'=2.34 mm;
angle "a" between the opposite surfaces of the longitudinal ribs placed side by side, a=40° (degrees);
radius between the longitudinal ribs placed side by side, r'=0.25 mm;
depth of the transversal cavities, h=1.2 mm;
pitch of the transversal cavities, p=4.7 mm;
angle "b" between the opposite sides of the transversal cavities, b=65° (degrees);
vertex of angle "b" at dimension lines, t=1.8 mm;
trepezium shape of the transversal cavities and protuberances as shown in FIG. 3.

The noise test has been carried out by means of the equipment shown in FIG. 5 as follows.

At different times belts 1 and 12 have been arranged between two pulleys 13 and 14 of a washing machine 15 having a device (not shown) for varying the number of revolutions of the washing machine drum from 0 to 1200 r.p.m.

For each belt the total noise has been registered as a function of varying the number of revolutions per minute by using a microphone 16 placed at the same level as the axis of the washing machine drum and at a distance K of 50 cm from this axis.

The number of revolutions has been detected through a stroboscopic probe 17 on the driven pulley.

The number of revolutions and the noise data conveniently amplified by a device 18, respectively measured in revolutions per minute and decibels (d b A), are provided to a recorder which plotted for belts 1 and 12 two graphs a and b.

Figure 6:
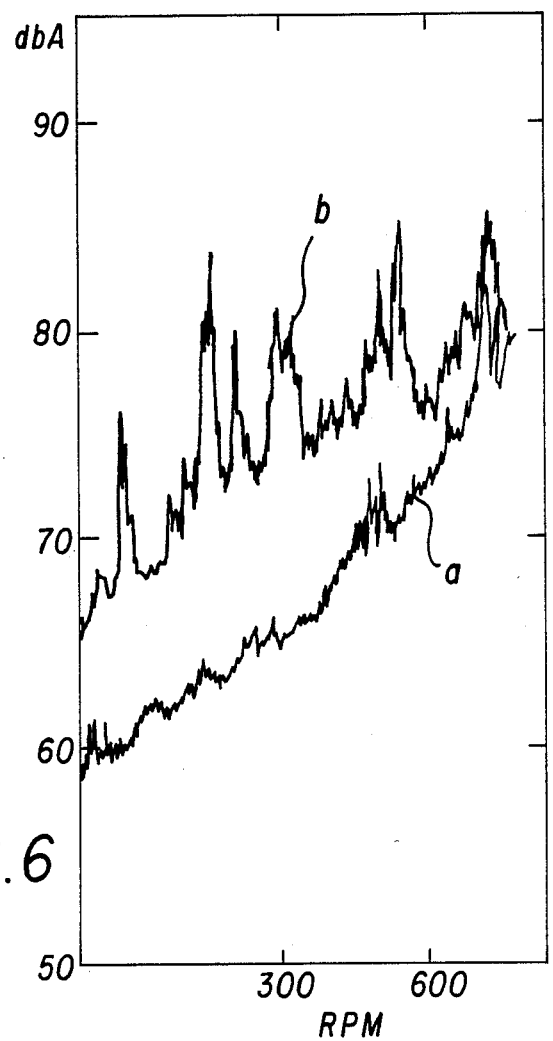
FIG. 6 is a diagram of the results obtained from a noise test of the belt of FIGS. 1, 2, 3 and 4.

Graphs a and b are shown in FIG. 6 in double logarithmic scale having recorded on the ordinates the total noise as a function of the number of revolutions per minute recorded on the abscissae.

The results of the test clearly prove through a simple comparison of graphs a and b, the elimination of noise peaks, i.e., the more troublesome ones, which can be felt and found in belt 12.

In substance, graph a stresses the flattening out of the noise curve of belt 1 according to the invention as compared with belt 12.

Moreover, the comparison between graphs a and b shows a constant lowering, substantially for almost all of the speeds of interest, of noise values of belt 1 as compared with belt 12 devoid of the characteristics of the present invention.

In an attempt to explain the achieved optimal results and consequently reduced noise with a contemporaneous increase of the flexibility of the present belt, the following hypothetical explanation is believed correct.

Figure 7:
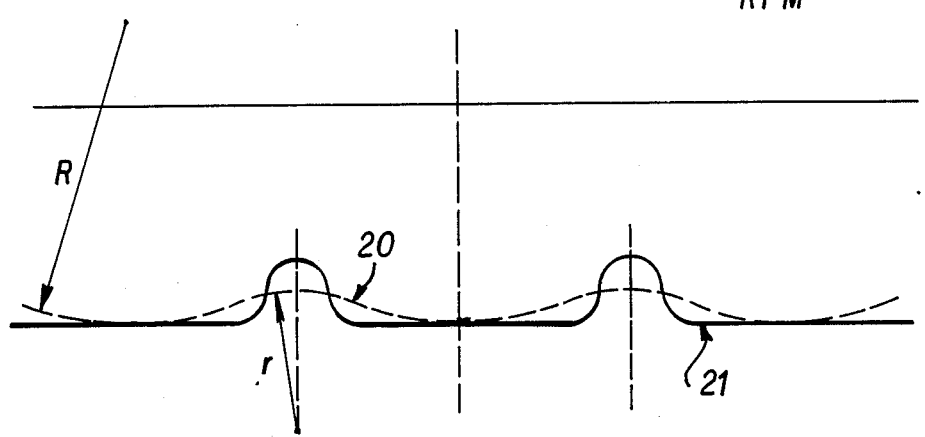
FIG. 7 shows an inner lateral profile of a belt according to the invention overlapped with the inner lateral profile of a belt of the state-of-the-art.

By way of example, FIG. 7 shows a grooved belt having a lateral undulated profile 20 according to the present invention, and also a profile 21 of a belt according to the prior state-of-the-art is illustrated overlapped with profile 20.

As shown in FIG. 7, for the purposes of this comparison, the belt of the state-of-the-art has the same dimensional values as the belt of the present invention, the protuberances and the transversal cavities have the same pitch, but with a difference that the transversal protuberances are delimited by a flat profile instead of an undulated one and the transversal cavities have a much narrower and deeper opening than that of the undulated profile, more or less with the proportions of FIG. 7.

As will be noted, the lateral profile of the present belt is characterized for the sequence of waves gradually and continuously passing from a curvature to an oppositely oriented curvature, while the lateral profile of the heretofore known belt is characterized by a sequence of flat sections separated by sudden inclined variations at the transversal cavities.

Briefly, it can also be stated that the lateral profile of the belt according to the invention is characterized for its continuity and that of the known belt for its discontinuity.

The two concepts that are found in the compared belts show in practice for the belt according to the invention, a removal of elastomeric material according to a wider area involving essential parts both in the length and in the width of each longitudinal rib, while for the known belt, a removal of material in depth forming in practice narrow and deep transversal grooves.

Merely from the contrasting characteristics of the known belts and those of the present invention a hypothesis can be advanced to explain the results of the noise test shown in FIG. 6.

In fact, it can be hypothesized that the air entrapped in the narrow and deep transversal grooves of the known belt, very probably, tends to escape more or less instantly when the belt leaves the relative pulley resulting in an intense and repeated whizzing noise for that determined pitch, while the air entrapped in the transversal cavities of the belt having a gradually undulated profile has the possibility of escaping uniformly gradually from the transversal cavities when the belt leaves the relative pulley, with the consequence that the previously entrapped air spreads now into a very wide zone avoiding whizzing noises and making uniform and acceptable the residual noise.

Another hypothesis to explain the phenomenon is as follows.

The belt of FIG. 7 defined by profile 21 has sudden or abrupt transitional sections between the protuberances and the adjacent transversal cavities, giving rise to different transversal deformations from one section to the other with equal reaction stress on the pulley.

In the cited circumstances, the belt having profile 21 when entering into the pulley produces bumps depending on the impact of each protuberance against the pulley surfaces.

The belt according to the invention, having an undulated profile 20 and being devoid of sudden transitions or passages between sections, is not subject to the strong differences of transversal deformations and therefore it does not produce upon its entry into the pulley the noise peaks caused by the impact of each protuberance.

As far as the values of the previously mentioned ratios p/h and r/h are concerned, the following hypotheses are made to explain the results achievable with the transversal cavities defined by the cited ratios.

The longitudinal ribs of the grooved belt during winding with a pulley are subject to a compressive condition with resultant contractions which become much higher at the final tapered part of the longitudinal rib.

Having already established a certain depth h of the transversal cavity, when values of ratio p/h lower than the previously indicated minimum value are reached, the pitches between one transversal cavity and the other could be too small and this could lead to a geometrical condition in which the transversal cavities are too near each other with the risk of unacceptable noise because of a too frequent repetition of the noise caused by escape of air from the cavities.

In other words, in some examples when values of p/h lower than the minimum value indicated are used, unsatisfactory results could be obtained.

Then, when values p/h higher than the maximum value indicated in the present invention are reached, a condition of protuberances which are too wide could arise and in some cases the compressive state acting on said protuberance could cause it to collapse.

The second geometrical condition linked to the ratio r/h is also important for the purposes of the invention.

To this purpose the following hypothesis could be made in order to explain the optimal results that are reached.

After defining the ratio p/h and the value of h, when values of ratio r/h smaller than the minimum value of the present invention are used, the longitudinal ribs would have lengths that are too great; consequently, during the winding step of the belt on the pulley it is possible to approach values resulting in instability due to compression forces on the longitudinal rib.

If values of r/h greater than the maximum limit established by the present invention were used, it would be possible to reach values of the radius of curvature of the transversal cavities which are too great, in practice a situation where having removed too much elastomeric material from the longitudinal ribs, the transversal load bearing capacity between the belt and the pulley would be reduced.

The present invention, described in connection with a particular embodiment of the belt having a grooved inner surface of a pre-determined thickness, is likewise applicable to grooved belts having dimensions different from those described herein.

In particular, the grooved belt can have a transversal section with total thicknesses in a range from 2.8 to 15.9 mm, longitudinal ribs with a pitch in a range from 1.6 to 9.4 mm, a height of the longitudinal ribs between 0.9 and 8.5 mm, and a number of ribs from 2 to 20 and more if necessary.

Moreover, it is stressed that the present invention, as described and illustrated above with reference to the characteristics of a grooved belt, can be applied likewise to belts of another type on condition that (1) the compressive part of the belt has at least two lateral, opposite and convergent surfaces intended to act by friction with corresponding surfaces of a pulley and (2) to permit the winding of the belt on pulleys having small radii of curvature, recourse is made to transversal cavities.

For instance, the invention can be applied to trapezoidal belts or V-belts or also to a plurality of V-belts joined together by means of a tape or like connecting element arranged in the upper part of the various belts.

Moreover, the invention is likewise applicable to belts which have in place of the longitudinal cords, other continuous or discontinuous elements able to form the part of the belt intended to bear the load.

For instance, fabrics or alternatively discontinuous fibers could be provided in place of the cords, with such measure and dimension as to provide a section having a greater resistance with respect to the contiguous ones.

Although some particular embodiments of the present invention have been illustrated and described herein, it is understood that the invention includes in its scope all the possible alternative embodiments readily envisioned by those skilled in the art.

For instance, the undulated profile of the cavities and transversal protuberances delimited by circular arcs can alternatively be delimited by curvilinear arcs of different shapes which approximate circular arcs and produce the same effects, for example, to cite only a few of many possible alternative arcs, parabolic arcs, elliptical arcs and hyperbolic arcs.

We claim:

1. A belt formed of elastomeric material suitable for transmitting forces in cooperation with at least two pulleys, said belt comprising:
    an outer part under traction;
    an inner part under compression;
    an intermediate part interposed between said outer part and said inner part and adapted to transport a load;
    said inner part comprising in a longitudinal direction at least two lateral, opposite and convergent surfaces for transmitting frictional forces in cooperation with corresponding surfaces of a pulley and a plurality of alternating cavities and protuberances directed transversely relative to said lateral surfaces;
    said protuberances and said cavities defining an undulated profile formed by curvilinear sections, each protuberance having a curvilinear section with a curvature opposite to the curvilinear section of its adjacent cavities; and
    a ratio between a pitch and a maximum depth of the transversal cavities being between 8 and 20, a ratio between the radius of curvature of the cavities and the maximum depth of the cavities being between 3 and 6.

2. A belt as in claim 1, wherein said inner part comprises in said longitudinal direction a plurality of pairs of said lateral, opposite and convergent surfaces, said plurality of pairs of lateral, opposite and convergent surfaces providing alternating longitudinal protuberances and longitudinal cavities, said undulated profile being formed on said longitudinal protuberances.

3. A belt as in claim 1 or 2, wherein said ratio between said pitch of said transversal cavities and said maximum depth is less than or equal to 14.

4. A belt as in claim 1 or 2, wherein said ratio between said radius of curvature of the transversal cavities and said maximum depth of said transversal cavities is between 3.5 and 4.5.

5. A belt as in claim 1, wherein said outer part has a flat outer surface and said inner part has an inner surface which includes a plurality of said lateral, opposite and convergent surfaces, said lateral, opposite and convergent surfaces being in the form of longitudinal ribs alternating with longitudinal cavities and which further includes a plurality of said transversal cavities and protuberances.

6. A belt as in claim 5, wherein a total thickness of said outer part, said inner part and said intermediate part is between 2.8 and 15.9 mm.

7. A belt as in claim 5, wherein a pitch of said longitudinal ribs, measured in a transversal plane, is between 1.60 and 9.40 mm.

8. A belt as in claim 5, wherein a height of said longitudinal ribs is between 0.9 and 8.5 mm.

9. A belt as in claim 5, wherein said longitudinal ribs are between 2 and 20 in number.

10. A belt as in claim 5, wherein a ratio between a pitch of said transversal cavities and a maximum depth of said transversal cavities is between 8 and 10.

11. A belt as in claim 5, wherein a ratio between a radius of curvature of said transversal cavities and a depth of said transversal cavities is between 3.8 and 4.2.

12. A belt as in claim 5, wherein a ratio between a depth of said transversal cavities and a height measured between said intermediate part and a head of said longitudinal ribs is between 0.25 and 0.6.

13. A belt as in claim 1, wherein said lateral, opposite and convergent surfaces constitute sides of a trapezoidal belt.

14. A belt as in claim 1, wherein said curvilinear sections have a substantially circular arc shape.

* * * * *